(12) United States Patent
Hodges et al.

(10) Patent No.: US 9,294,679 B1
(45) Date of Patent: Mar. 22, 2016

(54) REAL-TIME PERSPECTIVE CORRECTION

(71) Applicant: Visual Supply Company, Oakland, CA (US)

(72) Inventors: Zachary Daniel Hodges, Orinda, CA (US); Robert A. Newport, Oakland, CA (US)

(73) Assignee: Visual Supply Company, Oakland, CA (US)

( * ) Notice: Subject to any disclaimer, the term of this patent is extended or adjusted under 35 U.S.C. 154(b) by 0 days.

(21) Appl. No.: 14/555,200

(22) Filed: Nov. 26, 2014

(51) Int. Cl.
*H04N 5/222* (2006.01)
*H04N 5/232* (2006.01)
*G06T 3/00* (2006.01)

(52) U.S. Cl.
CPC .......... *H04N 5/23293* (2013.01); *G06T 3/0012* (2013.01); *H04N 5/23296* (2013.01)

(58) Field of Classification Search
CPC .. H04N 5/232; H04N 5/23296; H04N 5/2638
USPC .................................................. 348/333.12
See application file for complete search history.

(56) References Cited

U.S. PATENT DOCUMENTS

| | | | | |
|---|---|---|---|---|
| 2007/0266312 | A1* | 11/2007 | Ayaki et al. | 715/526 |
| 2009/0303204 | A1* | 12/2009 | Nasiri et al. | 345/184 |
| 2011/0050730 | A1* | 3/2011 | Ranford et al. | 345/660 |
| 2011/0164163 | A1* | 7/2011 | Bilbrey et al. | 348/333.01 |
| 2012/0206335 | A1* | 8/2012 | Osterhout et al. | 345/156 |
| 2013/0342723 | A1* | 12/2013 | Ishii et al. | 348/222.1 |
| 2014/0232634 | A1* | 8/2014 | Piemonte et al. | 345/156 |

* cited by examiner

*Primary Examiner* — Antoinette Spinks
(74) *Attorney, Agent, or Firm* — Schwegman Lundberg & Woessner, P.A.

(57) ABSTRACT

A system and method for correcting the perspective of visual data in real-time is disclosed. A electronic device accesses live visual data through a camera associated with an electronic device. The electronic device displays the live visual data on a display associated with the electronic device. The electronic device detects tilt data from a sensor associated with the electronic device, wherein tilt data indicates that the electronic device has tilted from an original angle to a current angle. In response to detecting tilt data from the sensor associated with the electronic device, the electronic devices alters the displayed live visual data to correct a live perspective of a live video feed.

18 Claims, 10 Drawing Sheets

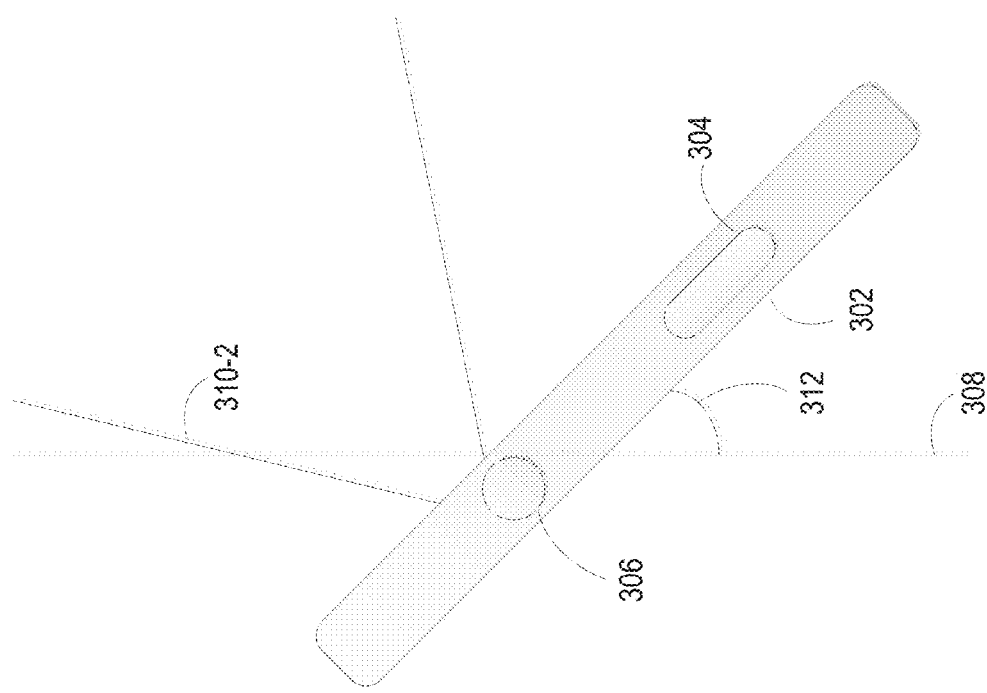
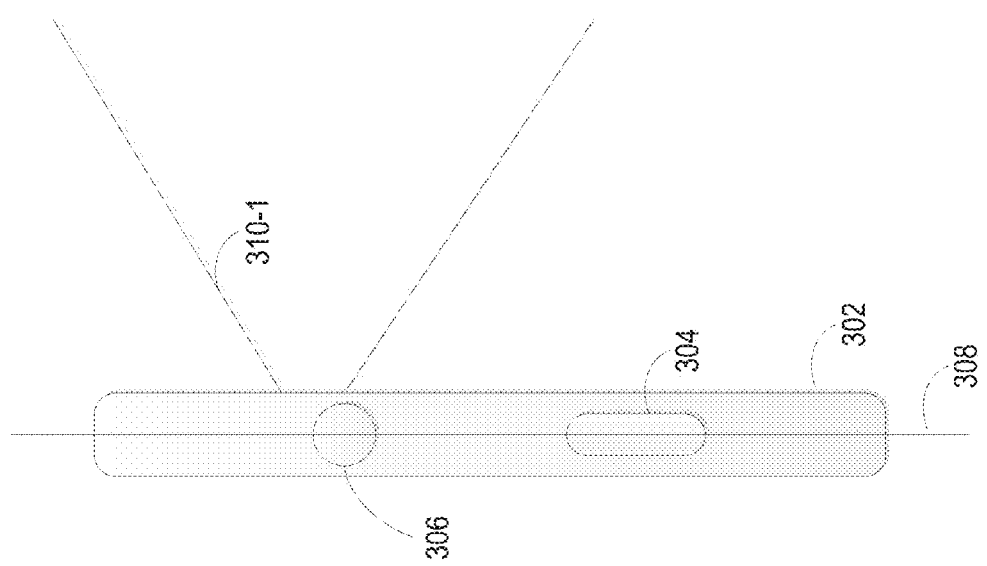
FIGURE 3A
FIGURE 3B

REAL-TIME PERSPECTIVE CORRECTION

TECHNICAL FIELD

The disclosed example embodiments relate generally to the field of mobile devices and, in particular, to the field of data transformation.

BACKGROUND

The rise of the computer age has resulted in a wide variety of electronic devices. One common type of electronic device is a personal electronic device that is intended to be carried around by a user, such as a smart phone, a tablet computer, or a smart watch. Each personal device has a large number of capabilities that increase its usefulness.

One common capability provided by personal devices is a camera. Cameras that are built into a personal electronic device allow the personal electronic device to capture visual data for pictures and videos. That data can be saved on the personal electronic device and displayed on the display associated with the device (e.g., a touch screen for a tablet computer). In some cases, the personal electronic devices can modify the visual data.

DESCRIPTION OF THE DRAWINGS

Some example embodiments are illustrated by way of example and not limitation in the FIGS. of the accompanying drawings, in which:

FIGS. 3A and 3B depict a diagram of an example electronic device, in this case a smart phone, in accordance with some example embodiments.

Like reference numerals refer to the same or similar parts throughout the drawings.

DETAILED DESCRIPTION

Figure 1:
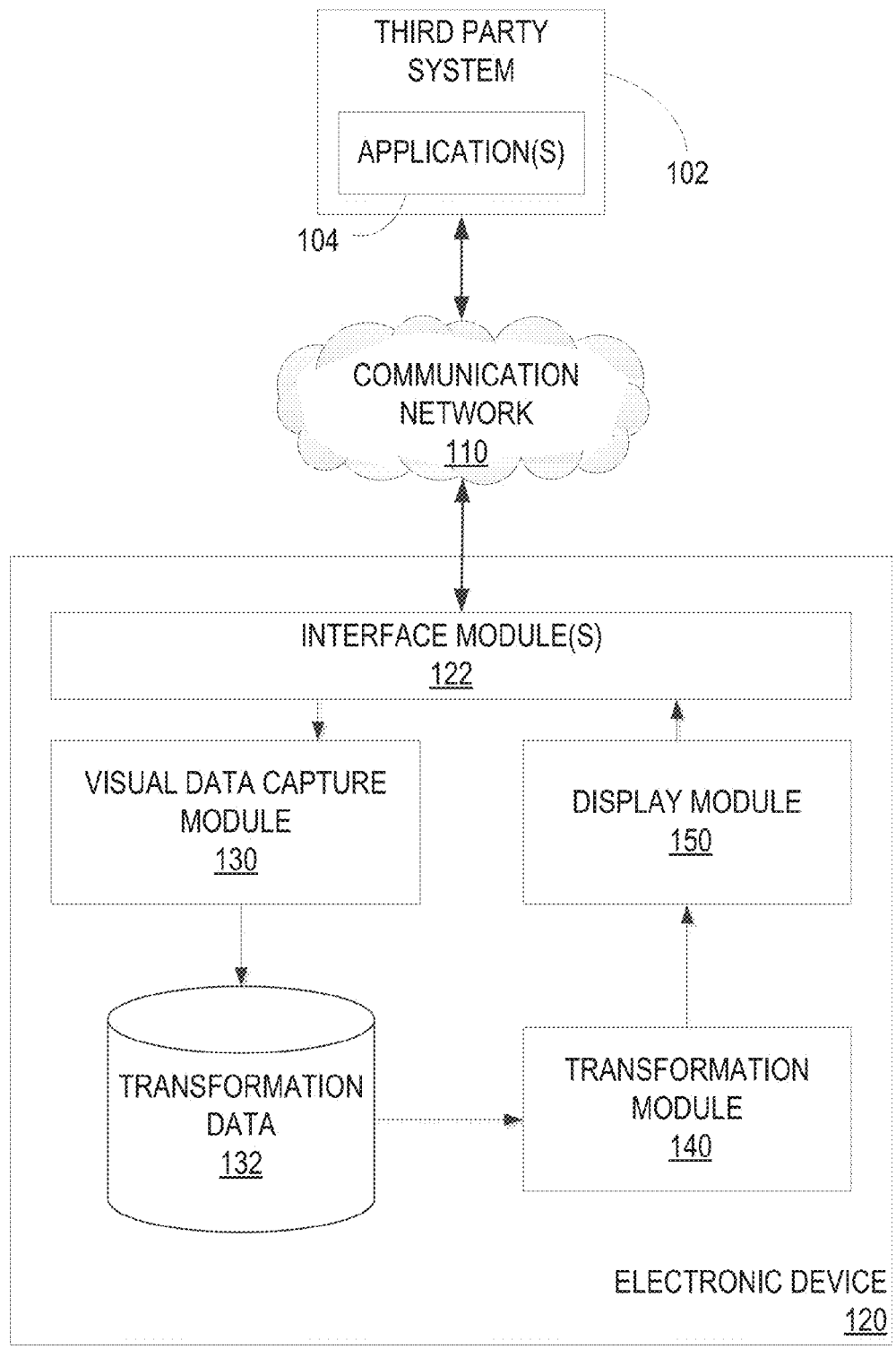
FIG. 1 is a block diagram depicting an electronic device in accordance with an example embodiment that includes various functional components.

The present disclosure describes methods, systems, and non-transitory computer readable storage mediums storing computer program products for correcting the perspective of visual data in real-time. In the following description, for purposes of explanation, numerous specific details are set forth to provide a thorough understanding of the various aspects of different example embodiments. It will be evident, however, to one skilled in the art, that any particular example embodiment may be practiced without all of the specific details and/or with variations permutations and combinations of the various features and elements described herein. It is understood, in various embodiments, that the operations and actions described herein can be performed by one or more processors of a mobile device executing an image processing application.

When a picture or video is taken by an electronic device camera (such as a mobile device camera), the tilt and positioning of the electronic device results in nearer objects appearing larger in an image and far objects appearing small in the image. Further, when a picture of a tall building is taken by the electronic device positioned near the bottom of the building, the electronic device is tilted upward. The upward tilt of the electronic device results in perspective distortions in which an image appearing on the electronic device's display screen portrays the top of the building as smaller than the bottom of the building, and the sides of the building will appear to be converging upwards. In contrast, a picture taken without any tilt of the electronic device does not have any areas of visual data that are smaller or larger or converging.

In some example embodiments, the perspective distortions can be corrected automatically, without manual intervention by the user, and in real-time. The electronic device detects visual data (e.g., data generated by the camera) and automatically adjusts the visual data to correct the perspective distortion (e.g., make the visual data appear as though the electronic device is not tilted with respect to the subject of the picture).

In some example embodiments, the electronic device (e.g., smart phone or tablet computer) has one or more sensors that produce data indicative of the electronic device's current position, tilt, and movement. For example, an accelerometer produces data that describes the current angle or angle changes of an electronic device.

Using the angle of the tilt, the electronic device can automatically, and in real-time, adjust the captured visual data to correct the perspective distortion caused by the tilt such that the visual data appears to be from an electronic device that is not tilted. In some example embodiments, this is accomplished by applying a transform matrix (e.g., an affine transformation) to each (x,y) coordinate position of each pixel of the live camera feed (e.g. live video feed, live image feed).

In some example embodiments, perspective correction is accomplished by transforming the visual data to enlarge (e.g., add pixels to) some sections of visual data and shrink (e.g., remove pixels from) other sections of the visual data. The net effect is that when a user tilts an electronic device upwards, the image being shown on the display of the electronic device does not present an image with perspective distortion (e.g., convergence). Instead, when viewing a building from the bottom (e.g., with the electronic device tilted upwards) the image data would be transformed such that the sides of the building are corrected automatically and in real-time so that they are portrayed as vertical and non-converging on the display of the electronic device.

In some example embodiments, the perspective correction includes applying predetermined static variables to the live camera feed. The static variables are included in the transform matrix and further modify the incoming visual data (e.g., pixel locations) so that the subject of the incoming visual data is skewed such that the subject of the incoming visual data is portrayed on the display of the electronic device within a desirable size range and as though the electronic device is positioned within a desirable distance range from the subject in the physical world. Application of the static variables ensures the perspective correction is optimized to be the most aesthetically pleasing. For example, if the subject of the incoming visual data is far away from the electronic device in the physical world, it will appear smaller in the electronic device display—the static variables included in the transformation function (e.g., a transform matrix) skew the incoming visual data so that the displayed visual image or video feed portrays a somewhat closer subject (even though it is not) since a closer subject would be larger on the display of the electronic device. By skewing the incoming visual data with the static variables, the effects of the perspective correction will be more noticeable and optimized aesthetically.

FIG. 1 is a block diagram depicting an electronic device 120, in accordance with some example embodiments. The electronic device 120 includes an interface module(s) 122, a visual data capture module 130, a transformation module 140, a display module 150, and transformation data 132. The electronic device 120 is connected to one or more third party systems 102. One or more communication networks 110 interconnect these components. The communication network 110 may be any of a variety of network types, including local area networks (LANs), wide area networks (WANs), wireless networks, wired networks, the Internet, personal area networks (PANs), or a combination of such networks.

In some example embodiments, as shown by way of example in FIG. 1, the electronic device 120 generally includes three types of components, including front-end components, application logic components, and data components. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various example embodiments have been omitted from FIG. 1. However, a skilled artisan will readily recognize that various additional functional modules and engines may be used with a electronic device 120, such as that illustrated in FIG. 1, to facilitate additional functionality that is not specifically described herein. Furthermore, the various functional modules and engines depicted in FIG. 1 may reside on a single server computer or may be distributed across several server computers in various arrangements. Moreover, although depicted in FIG. 1 as a three-component type of architecture, the various example embodiments are by no means limited to this architecture.

As shown by way of example in FIG. 1, the electronic device 120 includes an interface module(s) (e.g., a web server) 122, which receives data and/or requests from various third party systems 102, and communicates data back to the appropriate third party systems 102 when appropriate. For example, the network interface module(s) 122 sends a request to a third party system 102 for visual processing data for a particular type of filter or transformation. In response, the interface module 122 receives the requested data and transmits it to data storage.

As shown by way of example in FIG. 1, the data components include transformation data 132 for storing information on how to accomplish each potential transformation step. It should be noted that, in this application, database is used to refer to any method or type of data storage or retention and is not limited to formal databases. Thus, any data structure or format may be used to hold the data in transformation data 132. The application logic components include a visual data capture module 130, a transformation module 140, and a display module 150.

The visual data capture module 130 interfaces with a visual data capture device (e.g., a camera) to record live visual data in either video or image format. In some example embodiments, that data is either stored at the electronic device 120 or transmitted to a third party system 102.

In some example embodiments, the visual data capture module 130 then accesses the transformation data 132 to determine the current tilt of the electronic device 120 and access the data needed to perform a transformation to correct the perspective for the current visual data. The visual data capture module 130 constantly updates the tilt information from the transformation data 132 and adjusts the transformation to maintain the correct transformation.

In some example embodiments, the transformation module 140 receives the visual data and the transformation data 132 from the visual data capture module 130. The transformation module 140 then transforms the data (e.g., pixel by pixel with a transformation matrix) to correct the perspective. In some example embodiments, correcting the perspective includes enlarging some portions of the visual data and reducing the size of some portions of the visual data. In this way, the visual data (e.g., the live video or the image) is corrected such that the visual display shows an image or video with no converging lines, and so on.

In some example embodiments, the display module 150 receives the transformed visual data from the transformation module 140. The display module 150 then sends the transformed visual data to the display associated with the electronic device 120.

Figure 2:
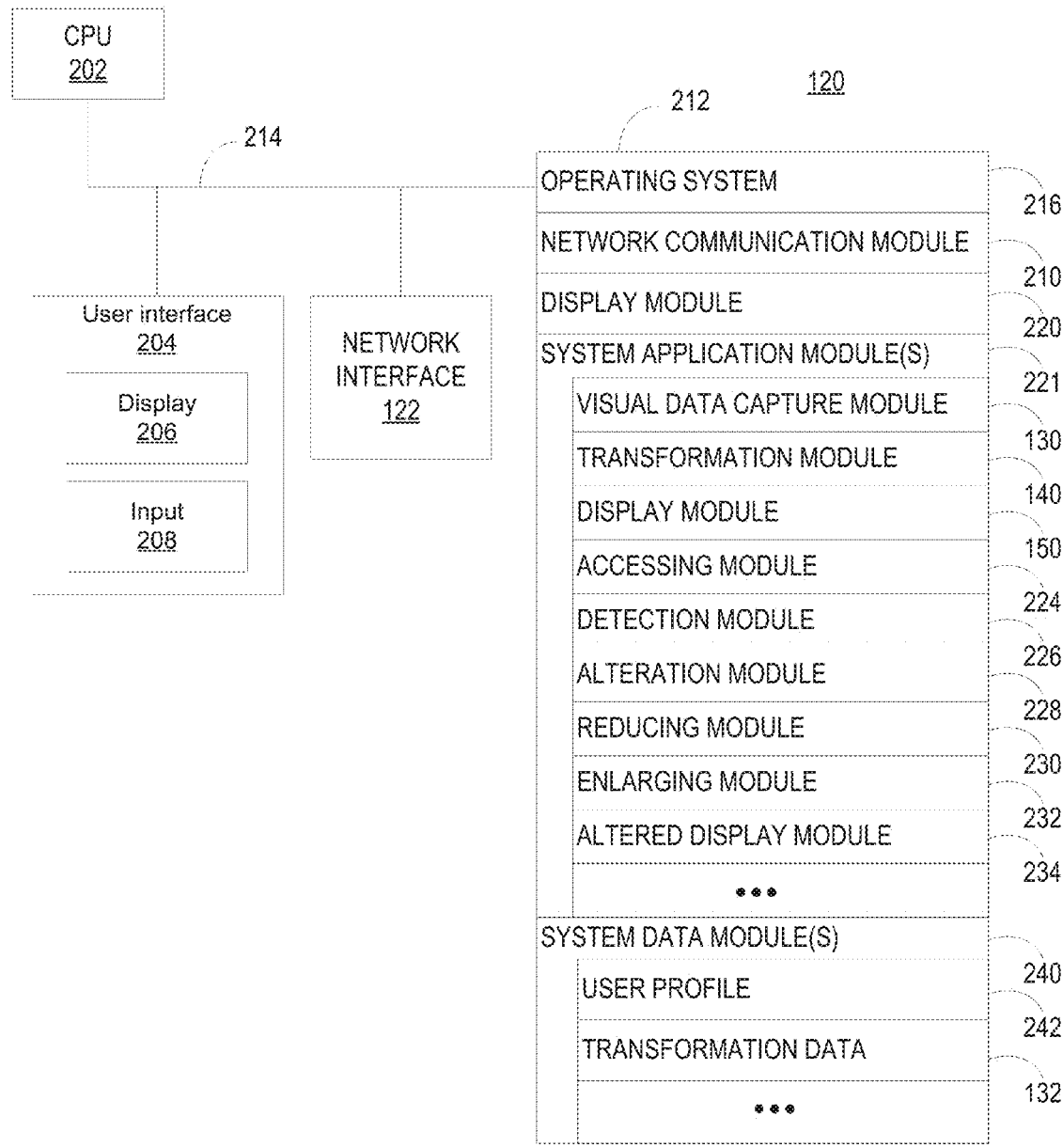
FIG. 2 is a block diagram illustrating an electronic device, in accordance with some example embodiments.

FIG. 2 is a block diagram illustrating an electronic device 120 in accordance with some embodiments. The electronic device 120 typically includes one or more processing units (CPU's) 202, one or more network interface 210, memory 212, and one or more communication buses 214 for interconnecting these components. The electronic device 120 includes a user interface 204. The user interface 204 includes a display device 206 and optionally includes an input means such as a keyboard, mouse, a touch sensitive display, or other input device 208. Furthermore, some electronic devices 120 use a microphone and voice recognition to supplement or replace the keyboard.

Memory 212 includes high-speed random access memory, such as dynamic random-access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately, the non-volatile memory device(s) within memory 212, comprise(s) a non-transitory computer readable storage medium.

In some embodiments, memory 212 or the computer readable storage medium of memory 212 stores the following programs, modules and data structures, or a subset thereof:
- an operating system 216 that includes procedures for handling various basic system services and for performing hardware dependent tasks;
- a network communication module 210 that is used for connecting the electronic device 120 to other computers via the one or more communication networks (e.g., network 110 in FIG. 1), such as the Internet, other wide area networks, local area networks, metropolitan area networks, etc.;
- a display module 220 for enabling the information generated by the operating system 216 and other system applications 221 to be presented visually on the display 206;
- one or more system application module(s) 221 for handling various aspects of interacting with the electronic device 120, including but not limited to:

a visual data capture module 130 for capturing visual data through an input device 208 such as a camera;

a transformation module 140 for altering the captured visual data in accordance with one or more transformation algorithms, wherein at least one of the one or more transformation algorithms is designed to remove perspective distortion from the visual data;

a display module 150 for preparing the transformed visual for display on the display 206 associated with the electronic device 120;

an accessing module 224 for accessing visual data from the visual data capture module 130 or from a visual data storage associated with the electronic device 120;

a detection module 226 for detecting tilt data from one or more sensors available through the electronic device 120;

an alteration module 228 for altering the captured visual data in accordance with the detected tilt data;

a reducing module 230 for reducing the size of one or more portions of the visual data to correct perspective;

an enlarging module 232 for enlarging the size of one or more portions of the visual data to correct perspective distortion of the visual data; and an altered display module 234 for ensuring the displayed visual data is continuously updated in real time to match any changes in the electronic device 120 tilt; and a system data module 240, for storing data relevant to the electronic device 120, including but not limited to:

user profile data 242 for storing profile data related to a user of the electronic device 120 and the use preferences of that user; and transformation data 132 for storing data needed to transform visual data to correct for perspective distortion.

FIG. 3A depicts a diagram of an example electronic device, in this case a smart phone 302. As can be seen in FIG. 3A, the smartphone 302 has one or more input buttons (304) and one or more ports 306 (e.g., for a headphone jack). FIG. 3A also displays a reference line 308 that demonstrates the center line of a vertically held smart phone 302. Exemplary lines 310-1 show the approximate viewing area of the smart phone 302 when held vertical.

FIG. 3B depicts a diagram of the example smart phone 302 from FIG. 3A. In FIG. 3B, the smart phone 302 includes the same components, such as one or more input buttons 304 and one or more ports 306, but the tilt angle has been changed. As can be seen, the center of the smartphone 302 no longer aligns with the reference vertical line 308. Instead, the phone has been tilted away from the vertical line by an angle 312. This angle 312 can be detected by the smart phone 302. With the tilted orientation, the smart phone 302 now has a different area of vision 310-2.

Figure 4A:
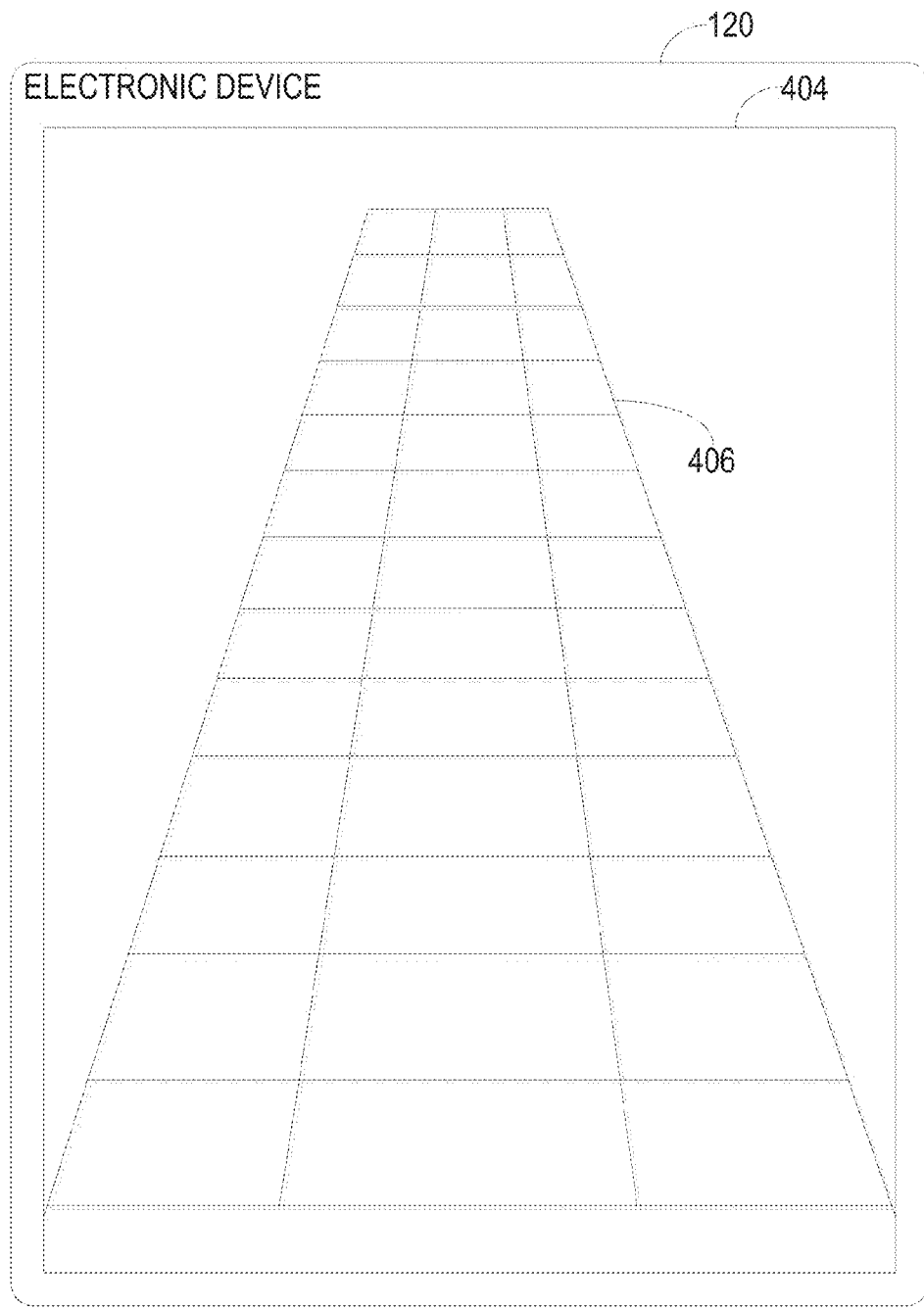
FIGS. 4A and 4B depict an exemplary user interface for an electronic device in accordance with some embodiments.

FIG. 4A depicts an exemplary user interface for an electronic device 120 in accordance with some embodiments. As can be seen, the electronic device 120 is currently displaying live video of a very tall building. The viewing angle 312 is low and thus the building 406 on the display 404 has lines that coverage as they move away from the electronic device 120 (in this case, near the top).

Figure 4B:
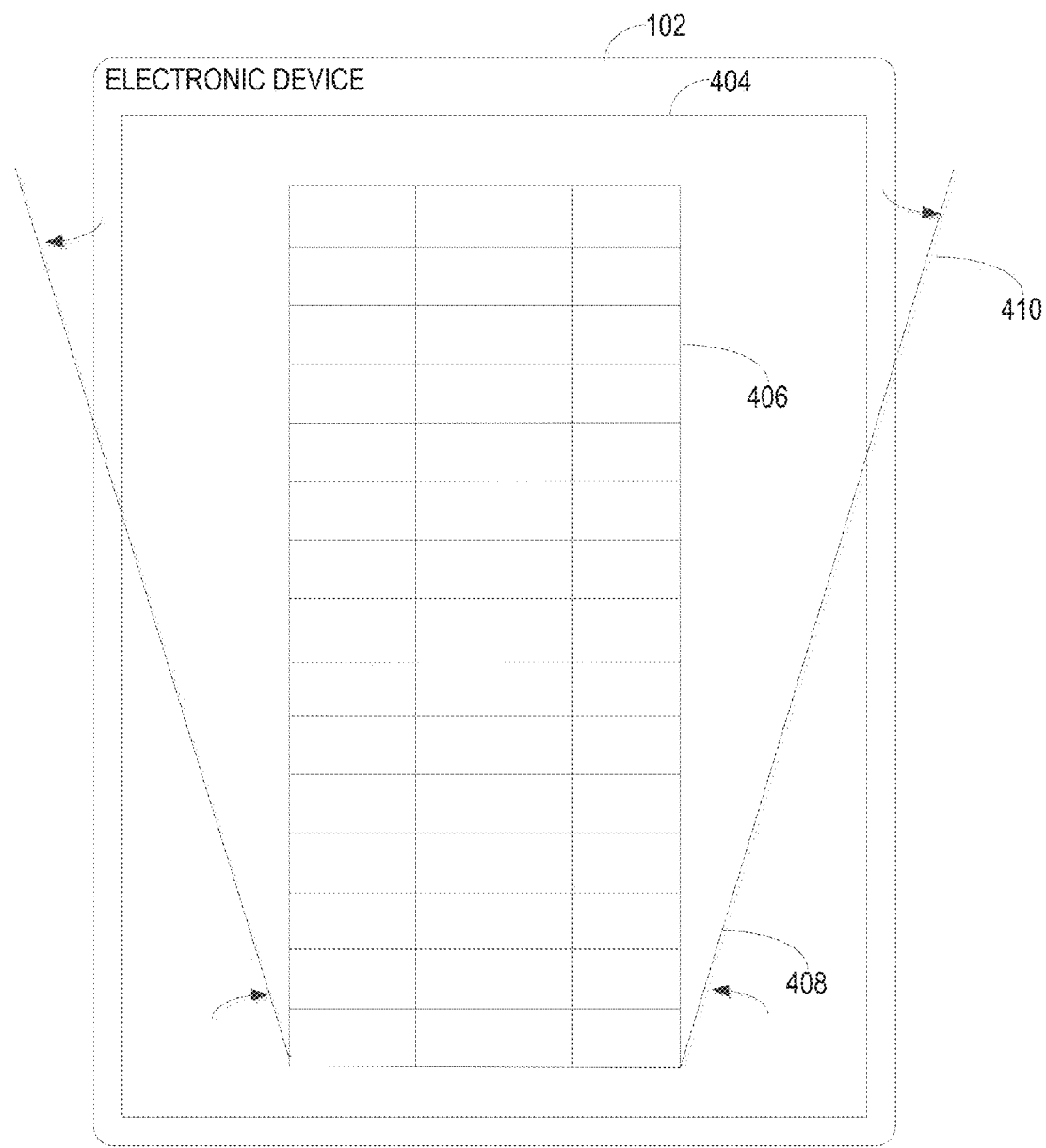

FIG. 4B depicts and exemplary user interface for the electronic device 120 show in FIG. 4A. In this example, the live video has been perspective corrected. As can be seen, the large building 406 is now displayed such that all the lines remain vertical and do not converge as they near the top of the display 404. As can be seen, the bottom of the building 406 has been reduced in size 408 and the upper part of the building 406 has been increased in size 410.

Figure 5:
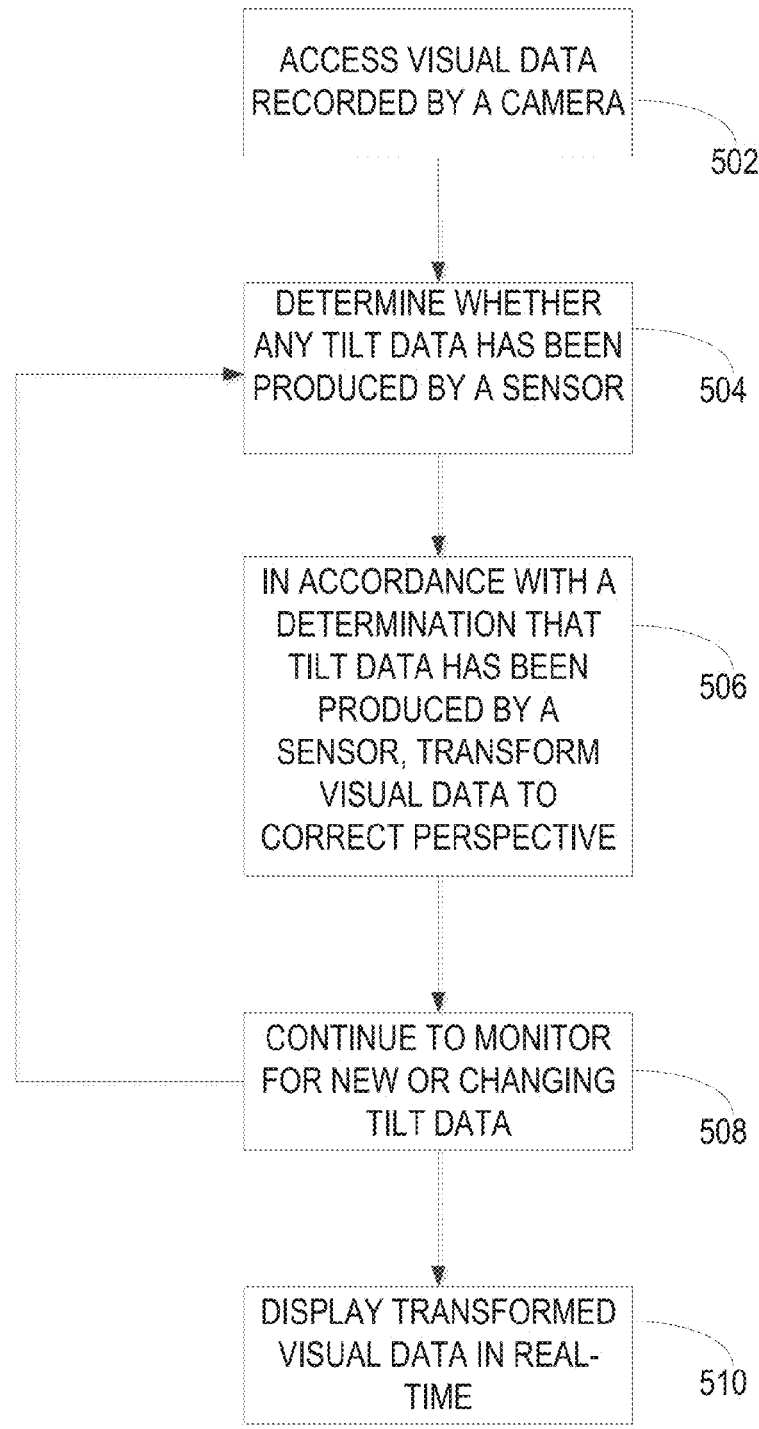
FIG. 5 is a flow diagram illustrating a method, in accordance with some embodiments, for correcting the perspective of visual data in real-time.

FIG. 5 is a flow diagram illustrating a method for correcting the perspective of visual data in real-time in accordance with some embodiments. Each of the operations shown in FIG. 5 may correspond to instructions stored in a computer memory or computer-readable storage medium. Optional operations are indicated by dashed lines (e.g., boxes with dashed-line borders). In some embodiments, the method described in FIG. 5 is performed by the electronic device (electronic device 120 in FIG. 1). However, the method described can also be performed by any other suitable configuration of electronic hardware.

In some embodiments, the method is performed at an electronic device (electronic device 120 in FIG. 1) including one or more processors and memory storing one or more programs for execution by the one or more processors.

In some example embodiments, the electronic device (electronic device 120 in FIG. 1) accesses (502) visual data recorded (or generated) by a camera associated with the electronic device (electronic device 120 in FIG. 1). For example, the visual data may be an image, a video, or a live video feed.

In some example embodiments, the electronic device (electronic device 120 in FIG. 1) then determines whether any new tilt data has been produced by a sensor (504) (e.g., whether the tilt of the electronic device (electronic device 120 in FIG. 1) has changed).

In accordance with a determination that the tilt of the electronic device (electronic device 120 in FIG. 1) has changed, the electronic device (electronic device 120 in FIG. 1) transforms (506) the visual data such that the visual data appears to be even or parallel with the subject, regardless of how the electronic device (electronic device 120 in FIG. 1) is actually tilted. Thus, if the electronic device (electronic device 120 in FIG. 1) is tilted to point up towards a top of a tall building, the image or video of the tall building 406 has a certain perspective, such that the lines of the building 406 seem to be converging at the farthest away part (e.g. the top) and the farther portions of the buildings appear smaller.

The electronic device (electronic device 120 in FIG. 1) transforms the visual data by correcting the perspective such that the building 406 appears as though the live video or image of the building 406 was taken from a non-tilted position and wherein the electronic device 120 was within a desirable distance range from the building. In this way, the image or video does not converge and the farther away portions are not smaller than the nearer portions. In some example embodiments, this is accomplished by applying a transform matrix to each pixel in the image or the video feed. In some example embodiments, an affine transform is used.

In some example embodiments, the electronic device (electronic device 120 in FIG. 1) continues (508) to monitor the sensor (e.g., a gyroscope or an accelerometer) for new or changing tilt data. While continuing to monitor for any change to the tilt, transformed visual data is displayed (510) on the display 404 of the electronic device (electronic device 120 in FIG. 1) in real-time. If changes to tilt data are detected, the process of transforming the visual data is updated to correct any perspective distortion that corresponds to the change in the tilt.

Figure 6A:
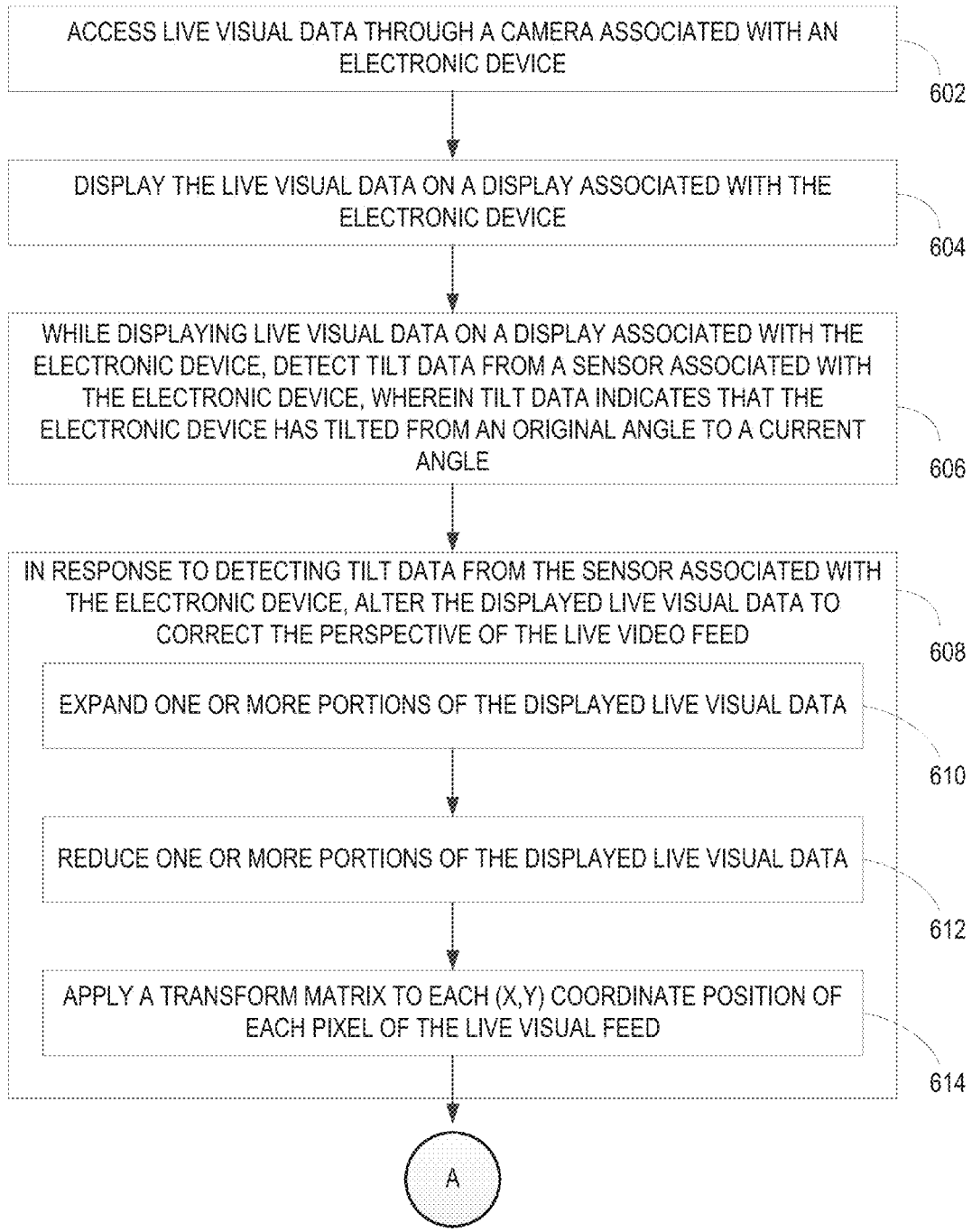
FIGS. 6A and 6B are flow diagrams illustrating a method for correcting the perspective of visual data in real-time in accordance with some embodiments.

FIG. 6A is a flow diagram illustrating a method for correcting the perspective of visual data in real-time in accordance with some embodiments. Each of the operations shown in FIG. 6A may correspond to instructions stored in a computer memory or computer-readable storage medium. Optional operations are indicated by dashed lines (e.g., boxes with dashed-line borders). In some embodiments, the method described in FIG. 6A is performed by the electronic device (electronic device 120 in FIG. 1). However, the method described can also be performed by any other suitable configuration of electronic hardware.

In some embodiments, the method is performed at an electronic device (electronic device 120 in FIG. 1) including one or more processors and memory storing one or more programs for execution by the one or more processors.

In some example embodiments, an electronic device (electronic device 120 in FIG. 1) accesses (602) visual data through a camera associated with an electronic device 120. In some example embodiments, this visual data is live and is accessed directly from a camera associated with the electronic device (electronic device 120 in FIG. 1). In other example embodiments, the visual data is first stored in data associated in a database at the electronic device (electronic device 120 in FIG. 1) and then accessed by the electronic device (electronic device 120 in FIG. 1). In other example embodiments, the visual data is stored at a third party system (e.g., system 102 in FIG. 1) and is accessed over a network 110.

In some example embodiments, the electronic device (electronic device 120 in FIG. 1) displays (604) the live visual data on a display 404 associated with the electronic device (electronic device 120 in FIG. 1). For example, a camera is capturing live video data and that video data is displayed on a screen of a smart phone 302 as it is captured (e.g., in real-time).

In some example embodiments, while displaying live visual data on a display 404 associated with the electronic device (electronic device 120 in FIG. 1), detecting tilt data from a sensor associated with the electronic device 120, wherein tilt data indicates that the electronic device 120 has tilted from an original angle 312 to a current angle 312 (606). In some example embodiments, the sensor is an accelerometer. In some example embodiments, the sensor is a gyroscope.

In some example embodiments, the tilt data describes the motion of the electronic device (electronic device 120 in FIG. 1) around a particular axis such as the x, y, or z axis or any combination thereof. Thus, regardless of how the user tilts the electronic device (electronic device 120 in FIG. 1) the sensors of the electronic device (electronic device 120 in FIG. 1) can measure that change and use it to correct the perspective effects.

In some example embodiments, in response to detecting tilt data from the sensor associated with the electronic device 120, the electronic device (electronic device 120 in FIG. 1) alters (608) the displayed live visual data to correct the perspective of the live video feed. In some example embodiments, altering the displayed live visual data is performed automatically, without any user intervention, in response to detecting tilt data.

In some example embodiments, altering the displayed live visual data is performed in real-time and the displayed visual data is updated in real-time.

In some example embodiments, altering the displayed live visual data includes expanding (610) one or more portions of the displayed live visual data. For example, in some embodiments, a section(s) of an image or video is increased to compensate for the perspective distortion caused by the angle 312 (or tilt) of the electronic device 120. Thus, pixels can be added (or expanded) to correct the perspective distortion. In some example embodiments, new pixels are added by way of interpolation. Interpolation is the process of constructing new data points within the range of a discrete set of known data points. In some example embodiments, altering the displayed live visual data includes the electronic device (electronic device 120 in FIG. 1) reducing (612) one or more portions of the displayed live visual data. For example, if a particular portion of a video or image is overrepresented due to perspective, the alterations will result in fewer pixels available to display that data. As a result, some of the pixels will be removed and/or combined with other pixels.

In some example embodiments, the electronic device (electronic device 120 in FIG. 1) receives an angle of tilt from a sensor (e.g., in the form of a floating point number). This angle of tilt can then be used to build a transform matrix. In some example embodiments, the values in the transform matrix are dynamically updated in real-time based on the most recent tilt data. In other example embodiments, one or more of the values in the transform matrix are static.

In some example embodiments, static values within the transformation matrix are called perspective modifiers, perspective exaggerator, a perspective multiplier, perspective optimizer, or any value that serves to ensure that the perspective is appropriate given the distance of the subject, the size of the subject, and the angle 312 of the camera. In some example embodiments, the perspective optimizers are constant regardless of the specific electronic device (electronic device 120 in FIG. 1) that they are being used in. Thus, the static values result in transforming the visual data such that the subject of the image or video appearing to be at an appropriate distance from the camera.

Thus the static value (e.g., perspective modifiers, perspective exaggerator, a perspective multiplier, perspective optimizer) allows an image to be transformed in accordance with a threshold distance and size that the incoming image data will be treated as though it is within to ensure the best possible perspective correction.

In some example embodiments, the values stored in the transform matrix are represented by angles 312, radians, or other numerical representation.

In some example embodiments, the distance of the object that is being corrected (e.g., a building) needs to be within certain bounds to correct the perspective. In some example embodiments, the alteration of the visual data includes making a subject of a photo appear closer or farther away so that the perspective corrected video/image is aesthetically pleasing.

In some example embodiments, altering the displayed live visual data includes the electronic device (electronic device 120 in FIG. 1) applying (614) a transform matrix to each (x,y) coordinate position of each pixel of the live visual feed. For example, each pixel has a specific x, y co-ordinate in the image or video feed. Each pixel position is then transformed using the transform matrix (e.g., using a dot product) to get a new (x, y) value for that particular pixel. Then the video feed can be rebuilt with each pixel in the location indicated after the transform matrix.

Figure 6B:
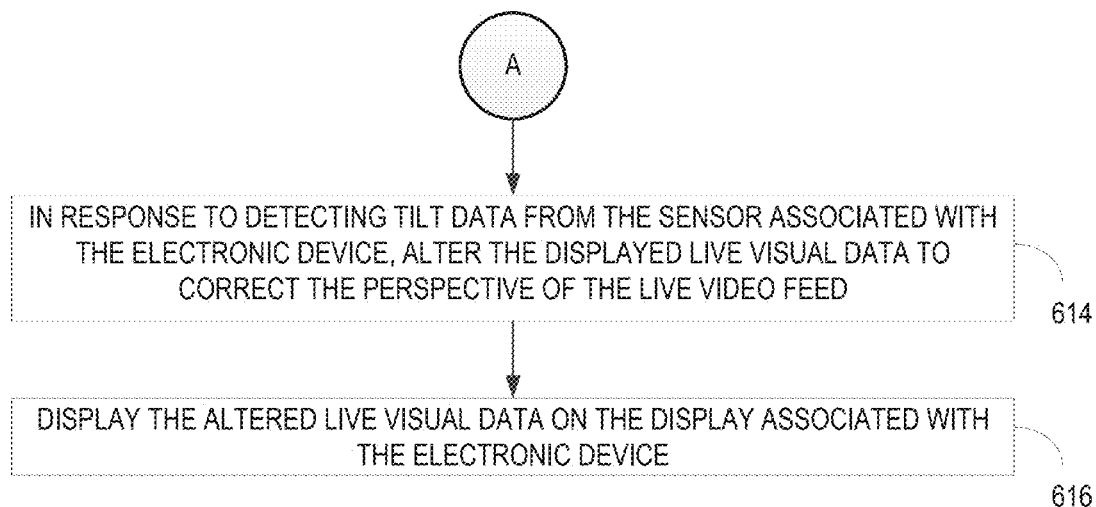

FIG. 6B is a flow diagram illustrating a method for correcting the perspective of visual data in real-time in accordance with some embodiments. Each of the operations shown in FIG. 6B may correspond to instructions stored in a computer memory or computer-readable storage medium. Optional operations are indicated by dashed lines (e.g., boxes with dashed-line borders). In some embodiments, the method described in FIG. 6B is performed by the electronic device (electronic device 120 in FIG. 1). However, the method described can also be performed by any other suitable configuration of electronic hardware.

In some embodiments, the method is performed at an electronic device (electronic device 120 in FIG. 1) including one or more processors and memory storing one or more programs for execution by the one or more processors.

In some example embodiments, the electronic device (electronic device 120 in FIG. 1) displays (614) the altered live visual data on the display 404 associated with the electronic device 120. Thus, the displayed live visual data is displayed in real-time in its transformed form. In this way, the user can view, in real-time, the perspective corrected video and/or image and is able to know whether the perspective correction has given the style/appearance of video the user wants.

In some example embodiments, the electronic device (electronic device 120 in FIG. 1) detects (616) further tilt data and continually alters the displayed visual data in accordance with the detected further tilt data.

Software Architecture

Figure 7:
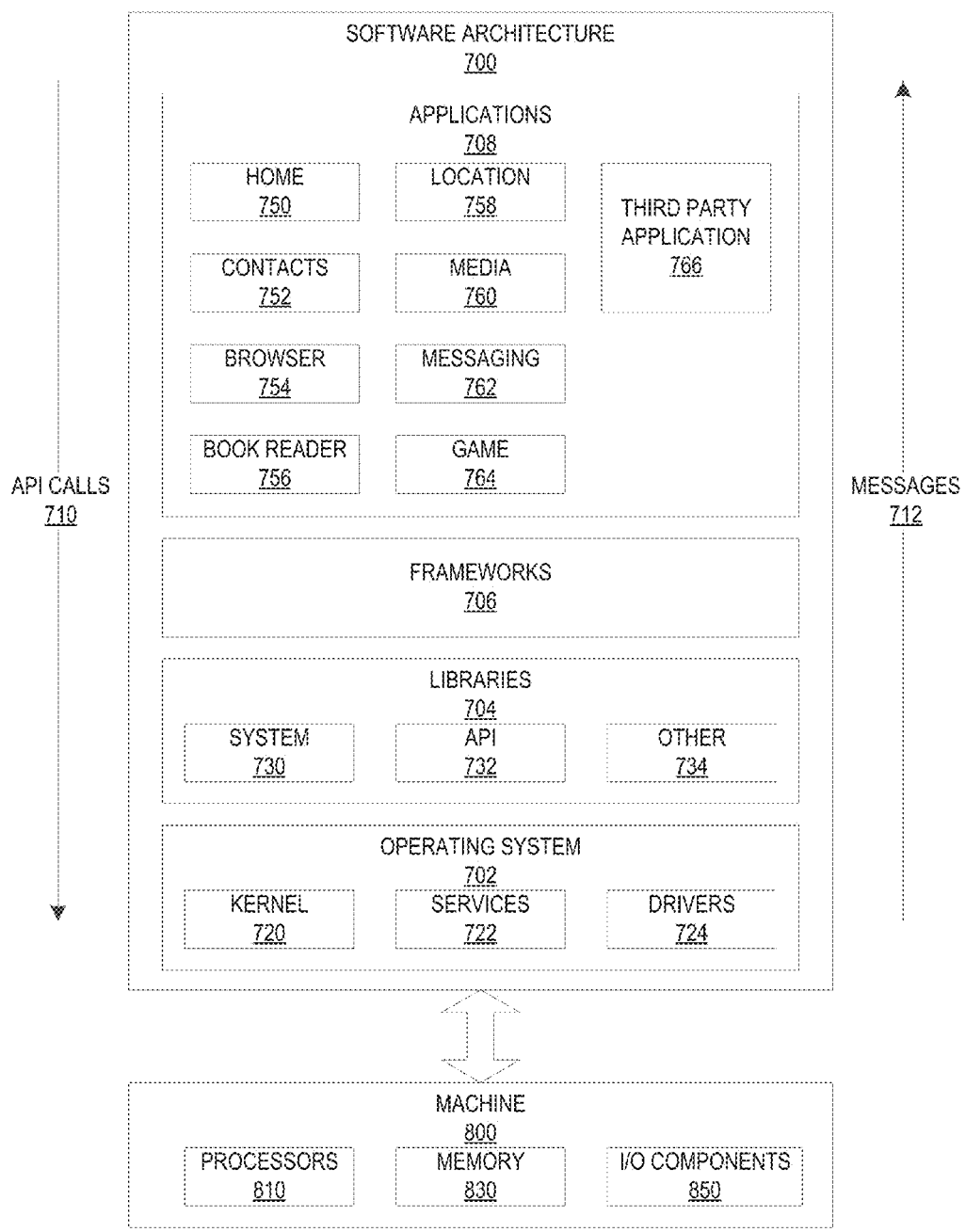
FIG. 7 is a block diagram illustrating an architecture of software, which may be installed on any one or more devices of a computer system.

FIG. 7 is a block diagram illustrating an architecture of software 700, which may be installed on any one or more of the devices of FIG. 1 (e.g., electronic device 120). FIG. 7 is merely a non-limiting example of a software architecture 700 that can be used in various computer systems described herein (e.g., computer system seen in FIG. 2), and it will be appreciated that many other architectures may be implemented to facilitate the functionality described herein. The software architecture 700 may be executing on hardware such as machine 800 of FIG. 8 that includes processors 810, memory 830, and I/O components 850. In the example architecture of FIG. 7, the software 700 may be conceptualized as a stack of layers where each layer may provide particular functionality. For example, the software 700 may include layers such as an operating system 702, libraries 704, frameworks 706, and applications 708. Operationally, the applications 708 may invoke application programming interface (API) calls 710 through the software stack and receive messages 712 in response to the API calls 710.

The operating system 702 may manage hardware resources and provide common services. The operating system 702 may include, for example, a kernel 720, services 722, and drivers 724. The kernel 720 may act as an abstraction layer between the hardware and the other software layers. For example, the kernel 720 may be responsible for memory management, processor management (e.g., scheduling), component management, networking, security settings, and so on. The services 722 may provide other common services for the other software layers. The drivers 724 may be responsible for controlling and/or interfacing with the underlying hardware. For instance, the drivers 724 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 704 may provide a low-level common infrastructure that may be utilized by the applications 708. The libraries 704 may include system libraries 730 (e.g., C standard library) that may provide functions such as memory allocation functions, string manipulation functions, mathematic functions, and the like. In addition, the libraries 704 may include API libraries 732 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 704 may also include a wide variety of other libraries 734 to provide many other APIs to the applications 708.

The frameworks 706 may provide a high-level common infrastructure that may be utilized by the applications 708. For example, the frameworks 706 may provide various graphic user interface (GUI) functions, high-level resource management, high-level location services, and so forth. The frameworks 706 may provide a broad spectrum of other APIs that may be utilized by the applications 708, some of which may be specific to a particular operating system 702 or platform.

The applications 708 include a home application 750, a contacts application 752, a browser application 754, a book reader application 756, a location application 758, a media application 760, a messaging application 762, a game application 764, and a broad assortment of other applications 708 such as third party application 766. In a specific example, the third party application 766 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third party application 766 may invoke the API calls 710 provided by the mobile operating system 702 to facilitate functionality described herein.

Example Machine Architecture and
Machine-Readable Medium

Figure 8:
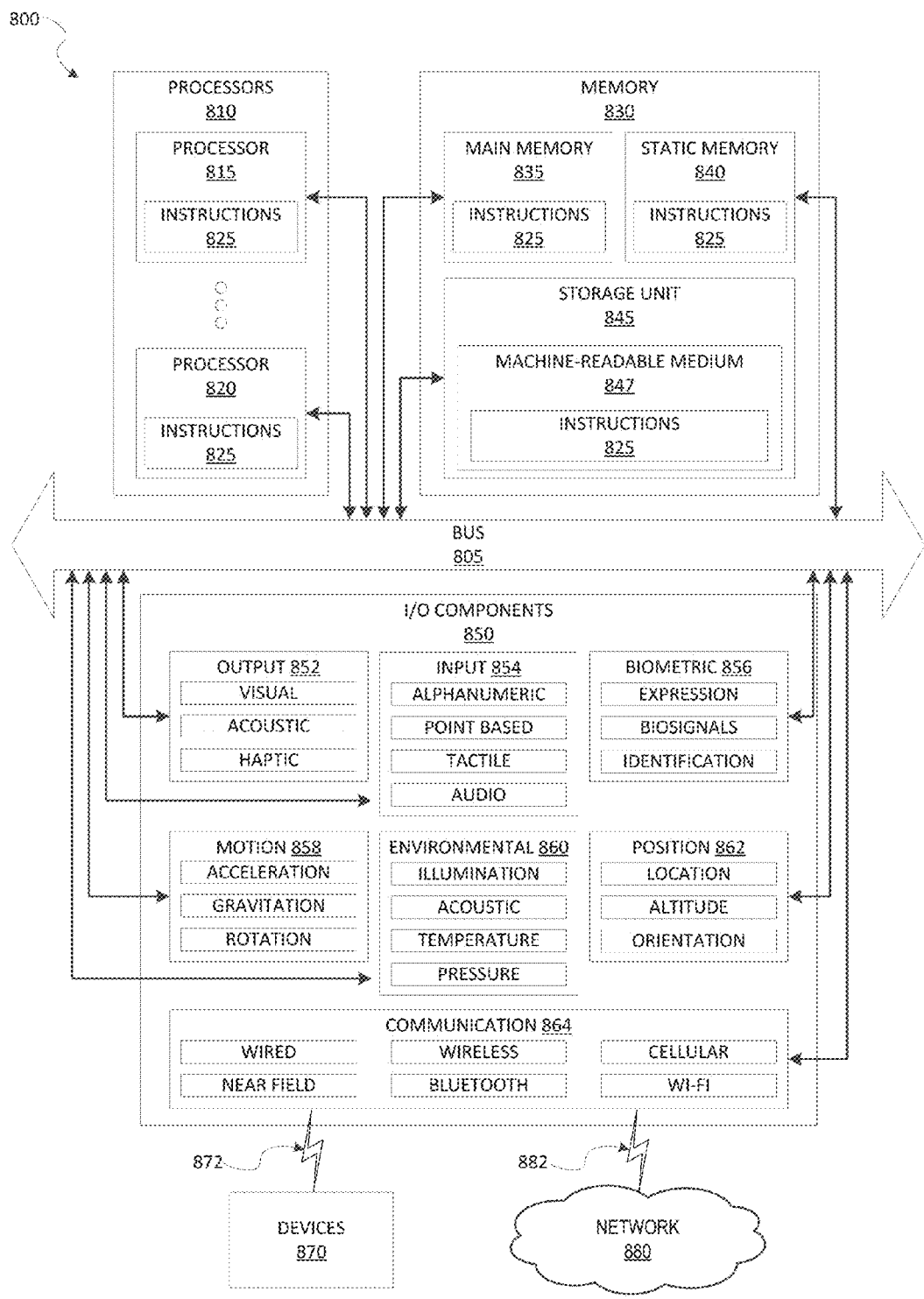
FIG. 8 is a block diagram illustrating components of a machine, according to some example embodiments.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 825 (e.g., software, a program, an application, an applet, an app, or other executable code) for causing the machine 800 to perform any one or more of the methodologies discussed herein may be executed. In alternative embodiments, the machine 800 operates as a standalone device or may be coupled (e.g., networked) to other machines. In a networked deployment, the machine 800 may operate in the capacity of a computer system or a third-party system in a server-client network environment, or as a peer machine in a peer-to-peer (or distributed) network environment. The machine 800 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 825, sequentially or otherwise, that specify actions to be taken by machine 800. Further, while only a single machine 800 is illustrated, the term "machine" shall also be taken to include a collection of machines 800 that individually or jointly execute the instructions 825 to perform any one or more of the methodologies discussed herein.

The machine 800 may include processors 810, memory 830, and I/O components 850, which may be configured to communicate with each other via a bus 805. In an example embodiment, the processors 810 (e.g., a CPU, a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 815 and processor 820 that may execute instructions 825. The term "processor" is intended to include a multi-core processor 810 that may comprise two or more independent processors 810 (also referred to as "cores") that may execute instructions 825 contemporaneously. Although FIG. 8 shows multiple processors 810, the machine 800 may include a single processor 810 with a single core, a single processor 810 with multiple cores (e.g., a multi-core process), multiple processors 810 with a single core, multiple processors 810 with multiples cores, or any combination thereof.

The memory 830 may include a main memory 835, a static memory 840, and a storage unit 845 accessible to the processors 810 via the bus 805. The storage unit 845 may include a machine-readable medium 847 on which are stored the instructions 825 embodying any one or more of the methodologies or functions described herein. The instructions 825 may also reside, completely or at least partially, within the main memory 835, within the static memory 840, within at least one of the processors 810 (e.g., within the processor 810's cache memory), or any suitable combination thereof, during execution thereof by the machine 800. Accordingly, the main memory 835, static memory 840, and the processors 810 may be considered as machine-readable media 847.

As used herein, the term "memory" refers to a machine-readable medium 847 able to store data temporarily or permanently and may be taken to include, but not be limited to, random-access memory (RAM), read-only memory (ROM), buffer memory, flash memory, and cache memory. While the machine-readable medium 847 is shown, in an example embodiment, to be a single medium, the term "machine-readable medium" should be taken to include a single medium or multiple media (e.g., a centralized or distributed database, or associated caches and servers) able to store instructions 825. The term "machine-readable medium" shall also be taken to include any medium, or combination of multiple media, that is capable of storing instructions (e.g., instructions 825) for execution by a machine (e.g., machine 800), such that the instructions 825, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 850 may include a wide variety of components to receive input, provide and/or produce output, transmit information, exchange information, capture measurements, and so on. It will be appreciated that the I/O components 850 may include many other components that are not shown in FIG. 8. In various example embodiments, the I/O components 850 may include output components 852 and/or input components 854. The output components 852 may include visual components (e.g., a display 404 such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 850 may include biometric components 856, motion components 858, environmental components 860, and/or position components 862 among a wide array of other components. For example, the biometric components 856 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, finger print identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 862 may include location sensor components (e.g., a GPS receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 and/or devices 870 via coupling 882 and coupling 872 respectively. For example, the communication components 864 may include a network interface component or other suitable device to interface with the network 880. In further examples, communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine and/or any of a wide variety of peripheral devices (e.g., a peripheral device coupled via a USB).

Moreover, the communication components 864 may detect identifiers and/or include components operable to detect identifiers. For example, the communication components 864 may include radio frequency identification (RFID) tag reader components, NFC smart tag detection components, optical reader components (e.g., an optical sensor to detect onedimensional bar codes such as Universal Product Code (UPC) bar code, multi-dimensional bar codes such as Quick Response (QR) code, Aztec code, Data Matrix, Dataglyph, MaxiCode, PDF48, Ultra Code, UCC RSS-2D bar code, and other optical codes), acoustic detection components (e.g., microphones to identify tagged audio signals), and so on. In additional, a variety of information may be derived via the communication components 864 such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 880 may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 825 may be transmitted and/or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 825 may be transmitted and/or received using a transmission medium via the coupling 872 (e.g., a peer-to-peer coupling) to devices 870. The term "transmission medium" shall be taken to include any intangible medium that is capable of storing, encoding, or carrying instructions 825 for execution by the machine 800, and includes digital or analog communications signals or other intangible medium to facilitate communication of such software.

Furthermore, the machine-readable medium 847 is non-transitory (in other words, not having any transitory signals) in that it does not embody a propagating signal. However, labeling the machine-readable medium 847 as "non-transitory" should not be construed to mean that the medium is incapable of movement; the medium 847 should be considered as being transportable from one physical location to another. Additionally, since the machine-readable medium 847 is tangible, the medium 847 may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
  accessing one or more predetermined static variables associated with visual data alteration;
  accessing live visual data through a camera associated with an electronic device;
  displaying the live visual data on a display associated with the electronic device;
  detecting tilt data from a motion sensor associated with the electronic device, wherein tilt data indicates that the electronic device has tilted from an original angle to a current angle;
  selecting one or more predetermined static variables from the received one or more predetermined static variables based on the detected tilt data and the live visual data; and in response to detecting tilt data from the motion sensor associated with the electronic device, automatically altering the incoming live visual data by expanding one or more first portions of the displayed live visual data and reducing one or more second portions of the displayed live visual data such that the altered live visual data appears to have a different perspective than the original live visual data, wherein altering the incoming live visual data includes using the selected predetermined static values in a transform matrix to alter the live visual data.

2. The method of claim 1, further comprising:
displaying the altered live visual data on the display associated with the electronic device.

3. The method of claim 1, wherein altering the incoming live visual data is performed in real time and the displayed visual data is updated in real-time.

4. The method of claim 1, further including, detecting further tilt data and continually altering the incoming visual data in accordance with the detected further tilt data.

5. The method of claim 1, wherein the motion sensor is an accelerometer.

6. The method of claim 1, wherein the motion sensor is a gyroscope.

7. The method of claim 1, wherein altering the incoming live visual data includes applying a transform matrix to each (x,y) coordinate position of each pixel of the live visual feed.

8. The method of claim 1, wherein the predetermined static variables include at least one of one or more perspective exaggerator values, one or more perspective multiplier values, and a perspective optimizer.

9. A system comprising:
one or more processors configured to include:
a data accessing module to access one or more predetermined static variables associated with visual data alteration;
an accessing module to access live visual data through a camera associated with an electronic device;
a display module to display the live visual data on a display associated with the electronic device;
a detection module to detect tilt data from a motion sensor associated with the electronic device, wherein tilt data indicates that the electronic device has tilted from an original angle to a current angle;
a selection module to select one or more predetermined static variables from the received one or more predetermined static variables based on the detected tilt data and the live visual data; and
an alteration module to, in response to detecting tilt data from the motion sensor associated with the electronic device, automatically alter the incoming live visual data by expanding one or more first portions of the displayed live visual data and reducing one or more second portions of the incoming live visual data such that the altered live visual data appears to have a different perspective than the original live visual data, wherein altering the incoming live visual data includes using the selected predetermined static values in a transform matrix to alter the live visual data.

10. The system of claim 9, further including:
an altered display module to display the altered live visual data on the display associated with the electronic device.

11. The system of claim 9, wherein altering the incoming live visual data is performed in real time and the displayed visual data is updated in real-time.

12. The system of claim 9, further including:
a detection module to detect further tilt data and continually altering the incoming visual data in accordance with the detected further tilt data.

13. The system of claim 9, wherein altering the displayed live visual data includes applying a transform matrix to each (x,y) coordinate position of each pixel of the live visual feed.

14. The system of claim 9, wherein the predetermined static variables include at least one of one or more perspective exaggerator values, one or more perspective multiplier values, and a perspective optimizer.

15. A non-transitory computer-readable storage medium storing instructions that, when executed by the one or more processors of a machine, cause the machine to perform operations comprising:
accessing one or more predetermined static variables associated with visual data alteration;
accessing live visual data through a camera associated with an electronic device;
displaying the live visual data on a display associated with the electronic device;
detecting tilt data from a motion sensor associated with the electronic device, wherein tilt data indicates that the electronic device has tilted from an original angle to a current angle;
selecting one or more predetermined static variables from the received one or more predetermined static variables based on the detected tilt data and the live visual data; and
in response to detecting tilt data from the motion sensor associated with the electronic device, automatically altering the incoming live visual data by expanding one or more first portions of the displayed live visual data and reducing one or more second portions of the displayed live visual data such that the altered live visual data appears to have a different perspective than the original live visual data, wherein altering the incoming live visual data includes using the selected predetermined static values in a transform matrix to alter the live visual data.

16. The non-transitory computer-readable storage medium of claim 15, further comprising:
displaying the altered live visual data on the display associated with the electronic device.

17. The non-transitory computer-readable storage medium of claim 15, wherein altering the incoming live visual data is performed in real time and the displayed visual data is updated in real-time.

18. The non-transitory computer-readable storage medium of claim 15, further including, detecting further tilt data and continually altering the incoming visual data in accordance with the detected further tilt data.

* * * * *